(12) United States Patent  
Biagiotti et al.

(10) Patent No.: US 8,788,228 B1  
(45) Date of Patent: Jul. 22, 2014

(54) METHOD AND SYSTEM FOR VALIDATING VIDEO WAVEFORMS AND OTHER ELECTRICAL SIGNALS

(75) Inventors: William Biagiotti, St. James, NY (US); Eli Levi, Dix Hills, NY (US); William Harold Leippe, Coram, NY (US)

(73) Assignee: Advanced Testing Technologies, Inc., Hauppauge, NY (US)

( * ) Notice: Subject to any disclaimer, the term of this patent is extended or adjusted under 35 U.S.C. 154(b) by 188 days.

(21) Appl. No.: 13/238,588

(22) Filed: Sep. 21, 2011

Related U.S. Application Data

(60) Provisional application No. 61/508,877, filed on Jul. 18, 2011, provisional application No. 61/528,306, filed on Aug. 29, 2011, provisional application No. 61/533,875, filed on Sep. 13, 2011.

(51) Int. Cl.  
*G01R 13/00* (2006.01)

(52) U.S. Cl.  
USPC .......................................................... 702/66

(58) Field of Classification Search  
USPC .............. 702/66, 67, 68, 69, 70, 71, 77, 108, 702/109, 112, 117, 124, 126, 183, 189; 345/418, 661, 204  
See application file for complete search history.

(56) References Cited

U.S. PATENT DOCUMENTS

| | | | |
|---|---|---|---|
| 4,598,324 A | 7/1986 | Efron et al. | |
| 4,736,447 A | 4/1988 | Korsinsky | |
| 5,065,447 A | 11/1991 | Barnsley et al. | |
| 5,404,316 A | 4/1995 | Klingler et al. | |
| 5,634,022 A | 5/1997 | Crouse et al. | |
| 5,655,144 A | 8/1997 | Milne et al. | |
| 5,794,007 A | 8/1998 | Arrigotti et al. | |
| 5,901,246 A | 5/1999 | Hoffberg et al. | |
| 5,903,261 A | 5/1999 | Walsh et al. | |
| 5,920,340 A | 7/1999 | Man et al. | |
| 5,991,805 A | 11/1999 | Krukovsky | |
| 6,055,018 A | 4/2000 | Swan | |
| 6,069,607 A | 5/2000 | Everett et al. | |
| 6,266,430 B1 | 7/2001 | Rhoads | |
| 6,502,045 B1 * | 12/2002 | Biagiotti | 702/66 |
| 7,084,394 B2 * | 8/2006 | Guevremont et al. | 250/286 |
| 7,643,653 B2 | 1/2010 | Garoutte | |
| 7,831,559 B1 | 11/2010 | Mohan et al. | |
| 7,890,514 B1 | 2/2011 | Mohan et al. | |
| 2006/0126916 A1 * | 6/2006 | Kokumai | 382/151 |
| 2007/0050166 A1 * | 3/2007 | Spinner et al. | 702/108 |
| 2007/0115360 A1 * | 5/2007 | Biagiotti et al. | 348/180 |
| 2011/0206268 A1 * | 8/2011 | Faulkner et al. | 382/140 |

FOREIGN PATENT DOCUMENTS

GB            2422204 A  *  7/2006

* cited by examiner

*Primary Examiner* — Sujoy Kundu  
*Assistant Examiner* — Ricky Ngon  
(74) *Attorney, Agent, or Firm* — Brian Roffe

(57) ABSTRACT

Method for validating a single waveform or series of waveforms that are intended for evaluating signals within an automated testing environment. Test signal data is supplied by an external source. The method creates a golden template from a known, good instance of the waveform under test and algorithmically applies it to other waveforms under test to determine compliance. In the application to video waveforms, timing parameters, deflection parameters and image content parameters are simultaneously tested resulting in efficient concrete and tangible results. Instead of providing the known, good instance of the waveform under test to a processor that implements the method, descriptive parameters of the known, good instance of the waveform may be provided to the processor that calculates data points of the expected video waveforms and then determines rules for the waveform based on the calculated data points.

26 Claims, 6 Drawing Sheets

METHOD AND SYSTEM FOR VALIDATING VIDEO WAVEFORMS AND OTHER ELECTRICAL SIGNALS

CROSS REFERENCE TO RELATED APPLICATION

This application claims priority under 35 U.S.C. §119(e) of U.S. provisional patent application Ser. No. 61/508,877 filed Jul. 18, 2011, U.S. provisional patent application Ser. No. 61/528,306 filed Aug. 29, 2011, and U.S. provisional patent application Ser. No. 61/533,875 filed Sep. 13, 2011, all of which are incorporated by reference herein.

FIELD OF THE INVENTION

The present invention relates generally to the field of automatic test equipment for the testing of electronic signals generated by equipment under test including, but not limited to, simultaneous complex signals. More specifically, the present invention relates to software methods (algorithms embodied on computer-readable media) for determining the validity of one or more complex electrical signals and software methods for analyzing the image content of complex signals.

BACKGROUND OF THE INVENTION

Automatic test equipment for the measurement and analysis of complex signals as exemplified by video signals is known. Among others, the current assignee, Advanced Testing Technologies, Inc., develops such equipment including instrumentation and related software.

The capability of video test instrumentation is mainly limited to commercial standard video format frame capture coupled with basic timing and analog component analysis. Because of the complexity, verification of image content is limited to that of very basic human pattern recognition, such as vertical or horizontal bars, grayscale, checkerboards or other images with easily discernable attributes for the user/operator to analyze through visual comparison. Image content is often a critical requirement in the pass/fail criterion of a system. Testing a system's image content becomes a trade-off requiring selection between utilizing canned, standard tests that a system manufacturer would provide, a hot mockup or investment in a thorough objective analysis. The latter of which requires test development time that a user would be required to undertake to create a test for a nonstandard, specific (perhaps, proprietary) image.

Validation of video signals (as well as other electrical signals) is typically based upon synchronous and asynchronous timing measurements, analog voltage measurements and/or visual content accuracy. An analog video standard, such as RS-170, describes specific time durations and voltage amplitudes for all of its components. The number of discrete analog measurements necessary for 100% compliance to the commercial standard is in the tens of thousands. Typical compromise to verify an RS-170 signal would include duration measurements of sync pulses, blanking intervals, and line time, and comparison of one or more of these measurements to specified limits. Next, voltage amplitude tests of those components would be measured and examined in a similar fashion.

Visual image content testing is designed around the expected image. If the image consists of a series of white bars on a black background, the start and end pixel denoting the location of each bar (located by, for example, measuring pixel amplitudes) may be compared to the expected location of the bar. If the signal characteristics are less than ideal due to, for example, equipment and/or cabling anomalies, the edge of the illuminated bar may possess a slow rise or fall time, a condition that would present visually as blurry (no distinct edges). Other possible failure modes include electrical noise, intermittent glitches, and ringing (reflections). Identification of these anomalies in an automated environment requires extensive testing, is easily missed by the user/operator performing analysis or is simply ignored.

The inventors herein have identified a need to provide a means to create an adaptive method which will expediently validate perfect or imperfect video signals (or other complex electrical signals) who through analysis combine timing measurements, analog voltage measurements and ultimately image content verification. In the present art, this method is not believed to be known. The invention, described below, was created to solve this problem.

As for related prior art, U.S. Pat. No. 6,502,045, assigned to the current assignee, includes a description of an 'error bounds tool', and which patent is incorporated by reference herein. Differing from the error bounds tool disclosed in the '045 patent, the present invention adds a new and novel method to automatically extract complex signal characteristics to create a set of rules from a known, good (golden) video image, describing the timing relationships, analog levels and image content, apply or compare the set of rules to a video image under-test and give a statistical report of the analysis including a pass/fail determination. As will be described more fully below, the present invention is capable of reducing the test development time resulting in measurable economic and time savings. In addition, it is now possible to test images, such as actual, complex military radar imagery, that would not have been possible with current off-the-shelf commercial equipment. Historically, this level of testing required an operator-in-the-loop to manually examine such a signal. Additional savings are produced by removing manual operations from the testing sequence.

SUMMARY OF THE INVENTION

The present invention incorporates features of a virtual spectrum analyzer (hereinafter referred to as a "VSA", of the type disclosed in U.S. Pat. No. 6,502,045) and a specific component of it, the errors bounds tool or error bounds toolkit. The error bounds toolkit is a method to create an error demarcation region over and under a test waveform to determine if any portion of the test waveform exists inside of the demarcation region, and is thus out of tolerance (or invalidated). A novel set of extensions to this concept provides a new quick and accurate method to address the difficult problem of validating a video image under test, as well as any other electrical signal.

A significant advantage of a method in accordance with the invention is that the demarcation region will simultaneously test and verify the three aspects of a video image necessary to perform a validation: a) timing parameters (such as video sync width, blanking porch width), b) signal amplitudes (i.e., sync level, blanking level, active pixel voltages (intensities) and c) spatial image content (i.e., locations of image pixels and their color assignments). By contrast, previous methods of validation required many timing measurements at calculated time intervals within a video frame and labor-intensive or computer-intensive analysis of image components. A major disadvantage of such previous methods is that they have to be manually re-engineered for every new video image content.

In one embodiment of the method for signal validation in accordance with the invention, the regions of demarcation (henceforth known as 'rules') may be automatically calculated from a known, good instance of the waveform-under-test, this automatic calculation possibly being performed during a preparatory or training stage when the known, good instance of the waveform-under-test is available. Thus, a set of 'rules' may be individually constructed for each unique region of the video frame, stored in a separate 'book' or repository of 'rules' for each video format with an index as to which portion of the waveform that the rules will apply to, and then reused as needed, i.e., via access to the book or repository and retrieval of the desired, stored rule from the book or repository. The only information that an operator needs to supply to the method is the desired error tolerance when deriving a pass/fail status report.

As examples of validation of waveforms, it is possible to validate the waveform with respect to signal noise, Y-axis variations such that a higher error bounds represents an upward vertical displacement and a lower error bounds represents a downward vertical displacement, and/or with respect to jitter, X-axis variations such that a higher error bounds represents a forward vertical displacement and a lower error bounds represents a rearward displacement. Use of the waveform validation method and system in accordance with the invention is not limited to signal noise and/or jitter and other tolerances using set higher and lower error bounds may be used in the invention.

In yet another embodiment of the invention, the video format parameters and visual image information may be supplied through a data conduit or connection directly to the method, i.e., the processing unit applying the method, bypassing the requirement for an actual known-good waveform. In this case, the processing unit would use the video format parameters and visual image information provided to it in order to calculate the data points of the expected video waveform(s) and then determines or calculate the 'rules' for these waveforms. Instead of video format parameters and visual image information, any other information or data, or combination thereof, that may be used to calculate data points of an expected video waveform, may be provided to the processor along with a computer program that enables the processor to determine the rules for the known, good video waveform either directly or indirectly through calculation of the data points of the waveform, may be applied in accordance with the invention without deviating from the scope and spirit thereof.

BRIEF DESCRIPTION OF THE DRAWINGS

A more complete appreciation of the present invention and many of the attendant advantages thereof will be readily understood by reference to the following detailed description of the invention when considered in connection with the accompanying drawings in which.

DETAILED DESCRIPTION OF PREFERRED EMBODIMENTS

The methods of this invention are generally based on the concepts described in the '045 patent mentioned above, which includes a description of an 'error bounds tool' or error bounds toolkit (see FIG. 22 and the discussion thereof). As stated in the '045 patent, the toolkit provides the ability to create several sets of upper and lower error bounds templates (for example, up to three (3) in a preferred embodiment) relative to which the present waveform(s) is/are analyzed. This analysis may include a comparison of the upper and lower error bounds templates to the present waveform(s), and may also or alternately include other types of analysis.

For one analysis, data points which fall into the error bounds are counted and a passing and/or failing percentile, and/or other statistics indicative or passing or failing a test, is/are calculated based on the number of data points that fall into the error bounds or do not fall into the error bounds. The results may be presented to the individual performing the validation in a variety of different ways, for example, visually by painting the error bounds over the current waveform and marking all out-of-range data with symbology. Error bounds may be created automatically from a known, good data swath or programmatically supplied by the user through the use of create and append commands.

The error bounds tool in accordance with the invention may be accessed by a control event handler (CEH) much the same way as discussed in FIG. 15 in the '045 patent. The CEH decodes a type of event by, for example, one of the decoding structures present in the CEH. Decoding typically entails recognition and parsing of the command. Thus, for the purposes of this invention, the CEH would determine that the command relates to a desire to set or adjust error bounds and access the error bounds tool.

Figure 1:
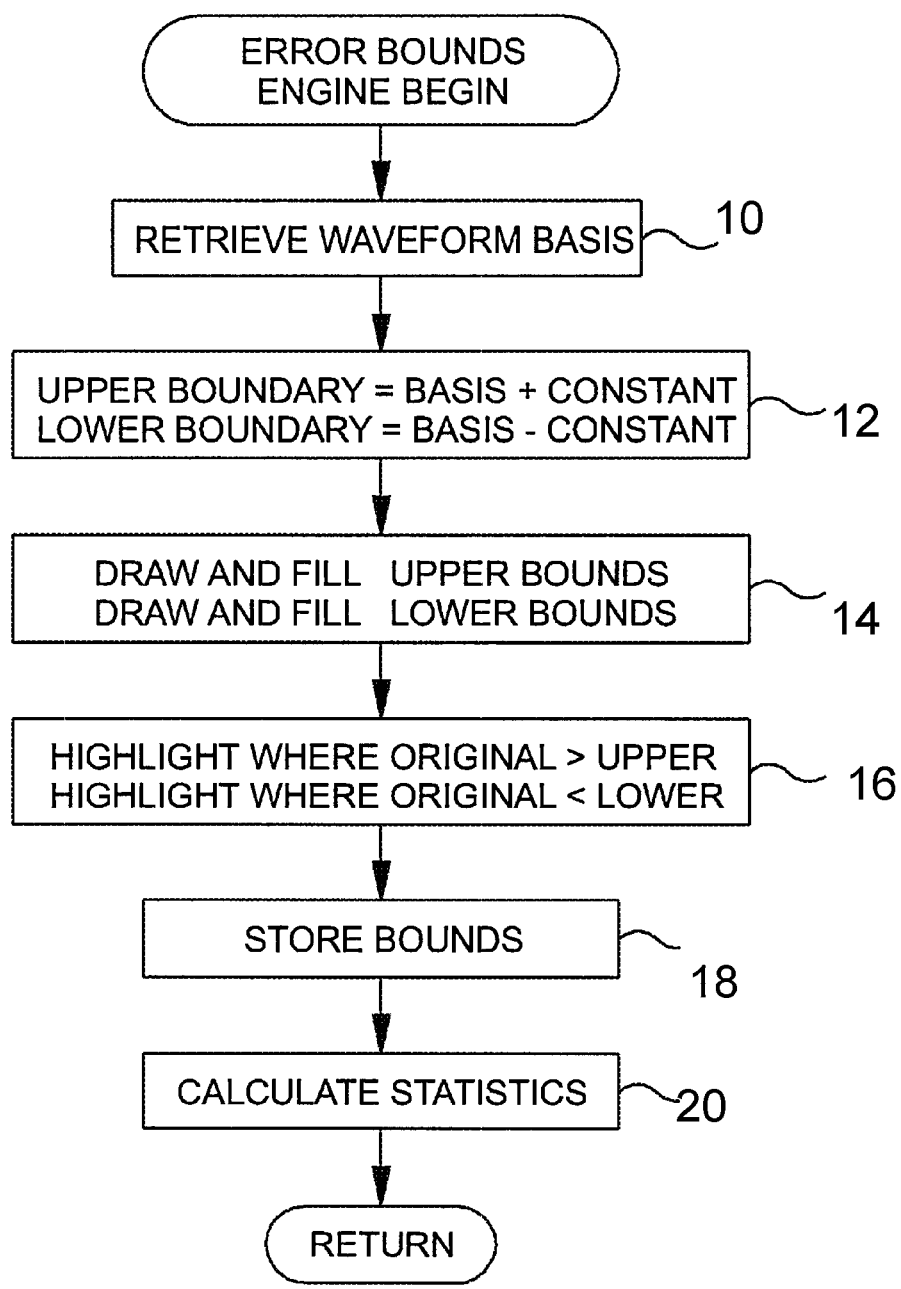
FIG. 1 shows a sample flow chart for operation of the error bounds toolkit in accordance with the invention.

The error bounds toolkit is then called by the CEH and operation of the error bounds toolkit is shown schematically in FIG. 1. The error bounds toolkit enables sets of upper and lower bounds templates to be created and relative to which the present waveforms are analyzed, e.g., compared to. The first step in the use of the error bounds toolkit is to retrieve the waveform basis information at 10. The upper boundary is set as the basis plus a constant (also referred to as a metric herein) whereas the lower boundary is set as the basis less the constant at 12. The upper and lower bounds are then preferably drawn and filled at 14. The portions of the waveforms that are greater than the upper bounds or lower than the lower bounds are optionally highlighted at 16. The bounds are stored at 18 and statistics relating to the presence of the errors, e.g., the duration of the waveform out of bounds, are optionally calculated at 20.

This technique is modified as described below to provide a vastly improved error bounds tool for use in signal validation, and particularly video signal validation.

For the purposes of the following description, reference will be made to 'video lines' and 'video frames'. These terms are interchangeable with 'waveforms' and 'groups of waveforms' and are intended to illustrate the application of this invention, but not limit the invention.

The method in accordance with the present invention extends the above concept of the error bounds tool by applying it in an unobvious manner to groups of simultaneous waveforms, analogous to red/green/blue video lines within a video frame. As used herein, a "group" of waveforms includes a plurality of waveforms, and not a single waveform.

This extension has the physical effect of creating an analysis or comparison template of a known, good video frame (i.e., golden template) relative to which other video frame data may be analyzed and validated, and thus the good video frame constitutes a known, good waveform or reference waveform. One purpose of the validation is to ensure that the hardware associated with the operation of the tested waveform is operational and is producing proper signals. In order for an analysis such as a comparison to be performed, the comparison template must possess or be associated with a means of storage so that it may be reused at one or more future points in time. For efficiency, it should be recognized that by nature, video signals define a degree of redundancy and the inventors have recognized and appreciated that this redundancy should be considered in the comparison template. This invention proposes a method of assigning specific rules to specific video line(s) and storing these rules in the same storage as the comparison template with an index specifying which rules applies to which video line(s).

A "rule" is defined herein as upper and lower timing-vs-voltage limit lines which are intended to be applied to waveforms to determine signal conformance to an accepted standard from which the templates are derived. Any part of the waveform under test that crosses or traverses the limit lines is considered to be out of tolerance. A single rule may contain up to three or more pairs of templates which apply to a grouping of up to three or more channels of simultaneous waveforms (analogous to R-G-B composite video). If a video line is to be tested, a rule is assigned it. A single rule may be assigned to multiple video lines for economy, if the expected value of the video lines is similar. For example, most 'blanked' video lines have identical makeup. Therefore, one rule may be assigned to that range of video lines. Also, it is not a requirement to have a rule assigned to every video line. Video lines may be unassigned and thus, not tested.

Furthermore, it is not a requirement to have both upper and lower bounds defined in a rule. Rather, a rule may contain, for one or more of the waveforms to which the rule is directed, only an upper, defined bound or only a lower, defined bound. In some embodiments though, each rule for each waveform to which the rule is directed includes both upper and lower timing-vs-voltage limit lines.

Figure 2:
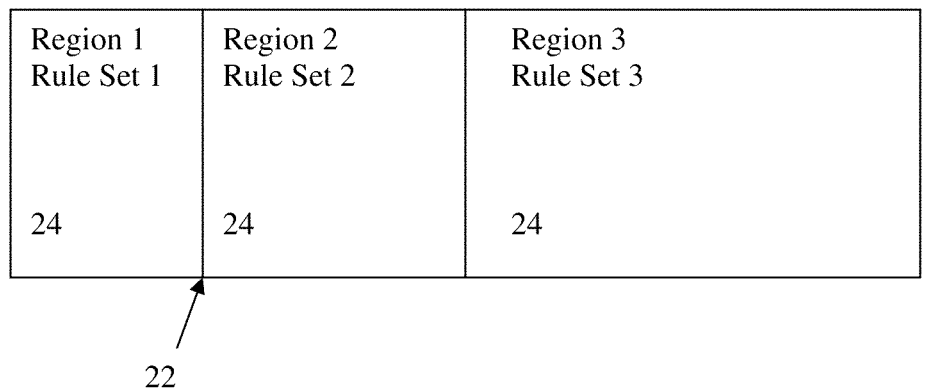
FIG. 2 is a schematic showing a video frame with several regions, each region having a set of rules.

The method of creating a rule is described in the '045 patent. By applying this method to all of the video lines in a video frame, a complete set of rules is defined. As used herein, a "set" of rules includes a plurality of rules and not a single rule. As shown in FIG. 2, a video frame 22 may be partitioned into several regions 24, for example, Region 1, Region 2 and Region 3, and for each region, one or more rules is defined so that for the entire video frame 22, a complete set of rules is defined. This set would therefore include at least three rules, i.e., a minimum of one for each region of the video frame 22.

Relative to the invention disclosed in the '045 patent, a variant or extension thereof is contemplated wherein the presence of a known-good waveform may be dispensed with. Rather, the golden video waveform (and thus the 'rules') may be created without the need to have the known-good video waveform present if specific description parameters are made available to the arrangement that implements the method, e.g., a processor 26 described below and related and accessory equipment. The equipment for implementing the method would be readily ascertainable by those skilled in the art in view of the disclosure herein.

The availability of the descriptive parameters (which describe, among other things, timing, amplitude and image content relating to the waveform) permit the processor 26 to internally calculate data points of the entire video waveform and operate on the calculated waveform to create the 'rules' as if the known-good waveform was actually captured from a physical source. Preferred parameters that enable calculation of the video format include, but are not limited to, any combination of the following: lines per frame, pixels per line, interlace factor, frame rate, sync on channel, aspect ratio, horizontal front porch time, horizontal sync time, horizontal back porch time, vertical front porch time, vertical sync time, vertical back porch time, serration pulses, equalization pulses, etc. The parameters listed above are applicable to composite video formats which, as known to those skilled in the art, include YPbPr and YCbCr. Parameters describing other video formats, such as, but not limited to, raster video, stroke video, and digital video, may also be provided when creating rules for these video formats.

When the active portion of the video (i.e., the image) is to be verified, the descriptive image information may be provided to the processor or other arrangement implementing the method in any appropriate means, such as, but not limited to: image files (such as BMP, JPG, PNG formats), or raw data files with individual pixel values. The image may be tested exclusively of the entire video waveform (i.e., it is not necessary to test the entire video waveform to verify the visual image).

Figure 3:
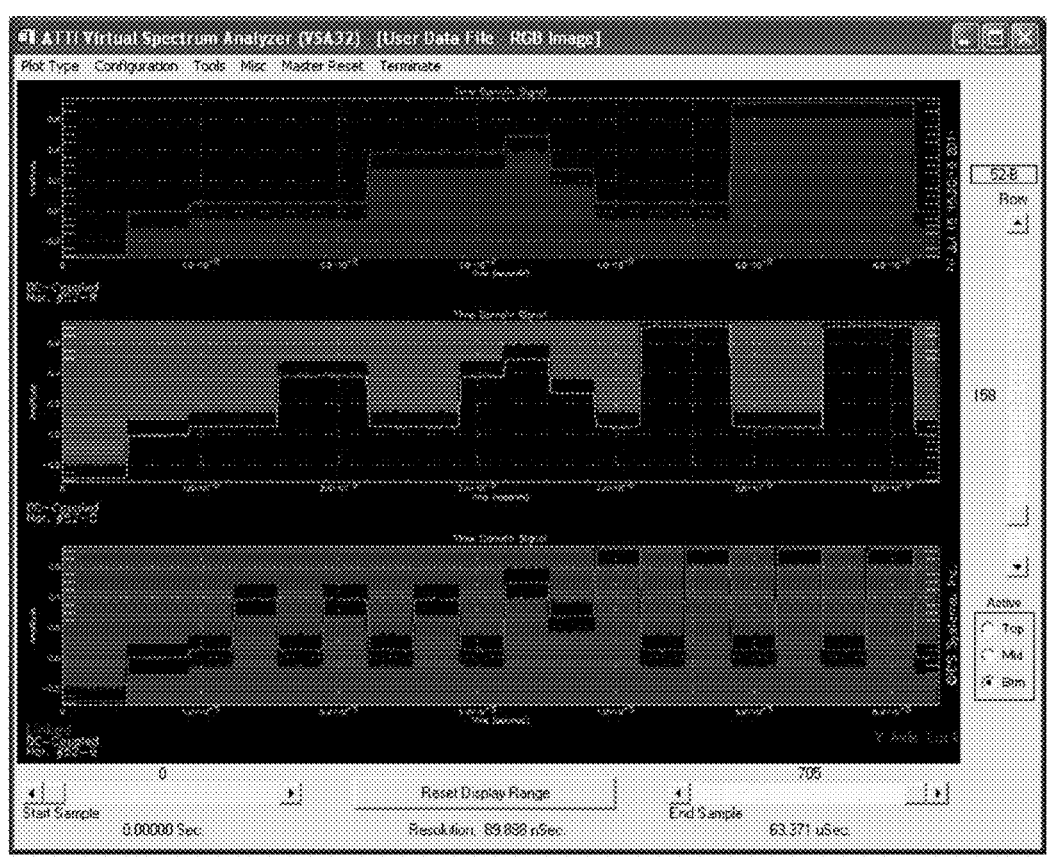
FIG. 3 shows a composite video waveform with error bounds demarcation applied.

FIG. 3 shows a composite video waveform with error bounds demarcation applied wherein the red waveform has a lower limit displayed (in the form of a single dotted line extending horizontally), the green waveform as an upper limit displayed (in the form of a single dotted line extending horizontally), and the blue waveform has both upper and lower limits displayed (in the form of a pair of parallel dotted lines extending horizontally).

Figure 4:
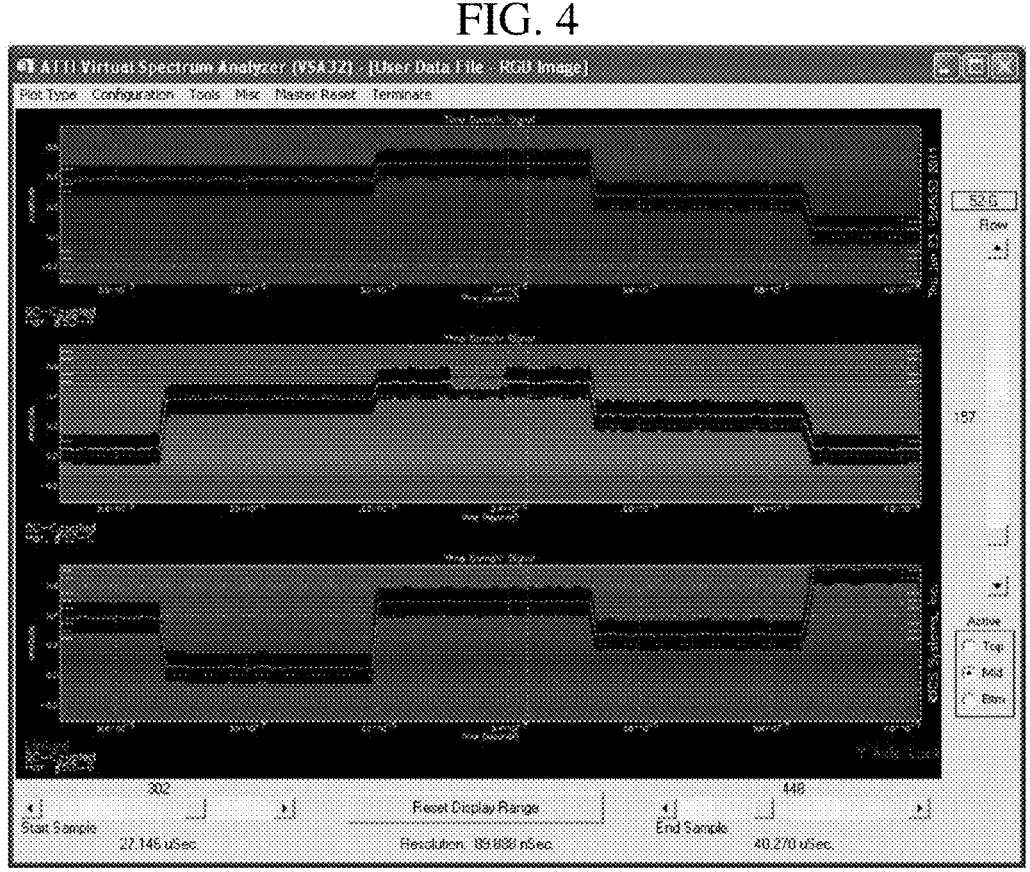
FIG. 4 shows a composite video waveform with error bounds demarcation applied and portions of the middle waveform calculated and denoted as erroneous.

FIG. 4 shows a composite video waveform with error bounds demarcation applied and portions of the middle (green) waveform calculated and denoted as erroneous. The manner in which the middle waveform is denoted as erroneous is in the form of an indicator line, indicating that this waveform has exceeded the upper limit.

It is an option for the operator to specify (program) the tolerance of the rule (i.e., what deviation from the ideal value is allowed). Programmable tolerance permits the use of this method in systems that possess a degree of electrical noise. Since the automated generation of the rule may be too stringent for certain systems, the invention also allows manual manipulation of the defined rule. That is, the operator can adjust a rule, or more than one rule, as desired based on his or her analysis.

In one embodiment, the calculated rule is displayed on a time vs. amplitude graph along with the tested waveform on a display screen of a computer or other type of monitor, known to those skilled in the art. A selectable option may be enabled, via one or more user interfaces connected to the computer display screen or other monitor or a processor or controller than controls the computer display screen or other monitor, which allows the operator to place, for example, a mouse or other indicator on the displayed graph and modify the rule in response to mouse button operations. Various user interfaces known to those skilled in the art may also be used instead of a mouse, that allow a user to interact with the graph and modify the graph, for example, a touch screen.

Rules may be stored in any permanent or nonpermanent electronic means of storage and recalled for use at a later time. The storage container holding the saved rules is called a 'book'. The "book" is similar to a repository or data storage unit in that it contains rules that can be accessed by a processor and appropriate software enabling interaction between the processor and the data storage unit.

As used herein, the contents of a 'book' is considered as storage for a grouping of rules or rule definitions plus association commands defining the areas of the test waveform to which specific rules are assigned, i.e., an index to the rules that correlates the rules to the areas of the test waveform. The following association commands are available during the stage at which the rules for the waveforms are determined, but do not limit the invention in any manner:

a. a 'DEFAULT' command will assign a specific rule to the selected line or waveform or portion thereof by default if no other rule has been assigned to a line.

b. an 'IF_X_THEN_Y' command assigns a specific rule to a specific line.

c. an 'IF_X_THRU_Y_THEN_Z' command assigns a single rule to lines numbered X through Y.

d. an 'IF X_THRU_Y_THEN_Z_THRU_Z1' command individually assigns a series of rules (numbered X thru Y) to a series of lines (numbered Z through Z1).

The above association commands comprise an efficient and flexible index specifying which rule to apply to which waveform(s) or portion thereof. Other association commands may be developed and used in accordance with the invention.

Figure 5:
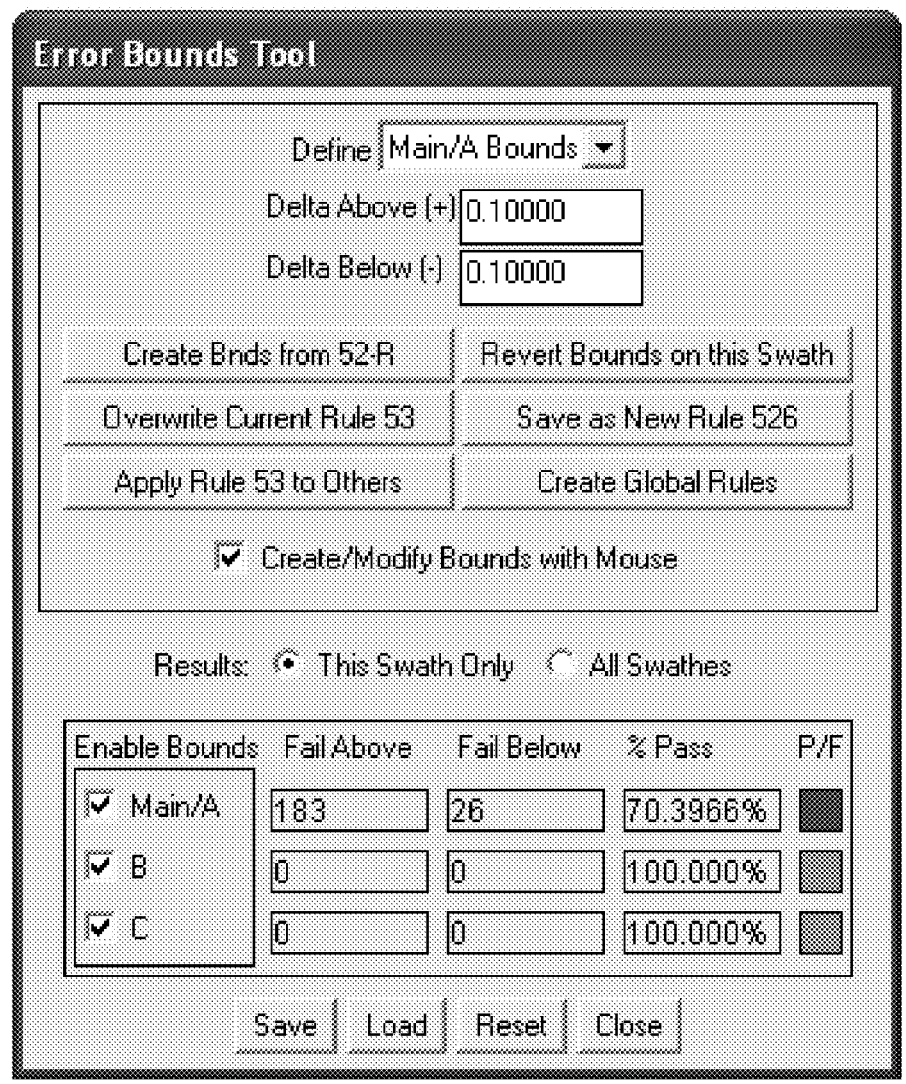
FIG. 5 shows the error bounds toolkit with calculated metrics.

FIG. 5 shows the error bounds toolkit with calculated metrics. As shown in FIG. 5, there are drop-down boxes and selectable regions of the screen used in the error bounds toolkit that enable the operator to create, use and apply the rules. The uppermost drop down box enables definition of a rule with the upper and lower differences, the deltas. Also shown is a check-box that allows the operator the ability to create and/or modify the bounds using a mouse, or other user interface. If checked, such creation and/or modification is allowed and if not checked, creation and modification are not allowed.

FIG. 5 also shows various options relating to use of the rules, e.g., "create global rules" which will calculate independent rules for all of the waveforms, i.e., all of the video lines within a complete video frame. Other options include the ability to save a new rule, overwrite an existing rule, create bounds from one or more other rules, apply one rule to other waveforms and revert the bounds on the selected swath.

Finally, FIG. 5 shows an analysis or results for the selected swath or all display swaths, e.g., the RGB waveforms. To the left of each row of results, there is a colored square which indicates if the calculated metrics has passed (green color) or failed (red color) the permissible thresholds, that have been programmed by the operator or otherwise provided to the system.

Figure 6:
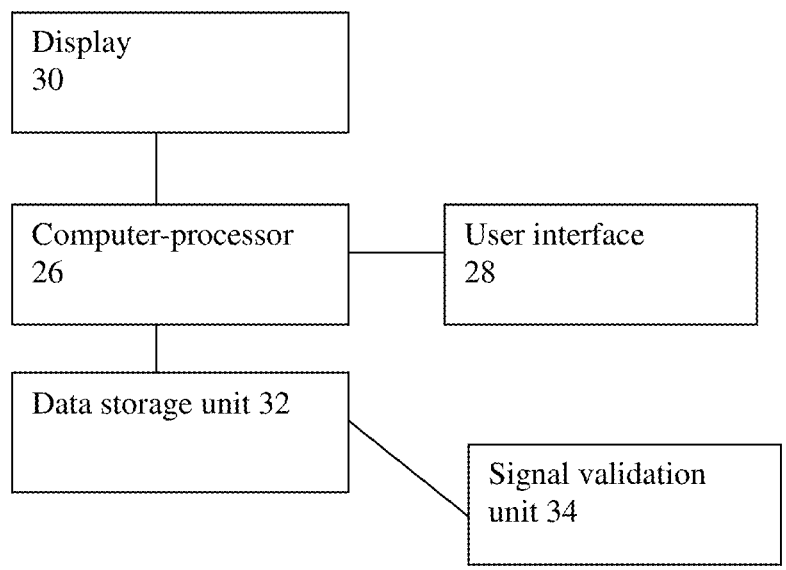
FIG. 6 is a schematic showing structure that may be used to implement the methods in accordance with the invention.

Referring now to FIG. 6, the structure in which the above method may be implemented is shown. This structure includes a computer 26 having a processor and access to software embodied on non-transitory computer-readable media, a user interface 28 coupled to the computer 26 and a display 30 coupled to the computer 26. A data storage unit 32 is also coupled to the computer 26 and a signal validation unit 34 is coupled to the data storage unit 32. Data storage unit 32 may have the capability of providing permanent data storage and/or non-permanent data storage.

The components illustrated in FIG. 6 can be connected to one another, via output and input ports and connectors and other electronic device connection structure known to those skilled in the art, or integrated into a common processing unit to provide the system shown therein. If connections are provided, e.g., from the computer 26 to the display 30, the connections are generally cables, wires and the like. The separation of different components into the blocks does not imply that the separate components are physically separated from one another and two or more of the components, although shown in different blocks, may be integrated into a common piece of electronic hardware or a common piece of software. Moreover, the connections between the different components do not limit the connections and alternative connections are possible in the invention, e.g., connecting the signal validation unit 34 to the computer 26 instead of to the data storage unit 32.

The computer 26, user interface 28 and display 30 enable testing personnel to view a waveform such as those comprising a video frame, create a comparison template from the waveform and then create rules to associate with the comparison template. An index is also formed which indicates which set of rules apply to which portion of the waveform. The comparison template, sets of rules and index are all stored in the data storage unit. The content of the data storage unit 32 might thus appear as in the following table:

|  |  | Index | |
| --- | --- | --- | --- |
| Waveform | Comparison template to use | Waveform portion | Rule set to use |
| Perfect video signal | A | 1 | A3 |
|  |  | 2 | A2 |
| Imperfect video signal | B | 1 | A1 |
|  |  | 2 | A3 |
|  |  | 3 | A2 |

The comparison template is specific to the waveform so that when the same waveform is desired to be operatively validated, i.e., is the waveform-under-test, the comparison template for the same waveform will be accessed, e.g., via the coupling between the signal validation unit 34 and the data storage unit 32.

As an example, when it is desired to validate a perfect video signal as the waveform-under-test, the signal validation unit 34 accesses the data storage unit 32 and retrieves comparison template A. Then, using the index, rule sets A3 and A2 are obtained and applied to portions 1 and 2 of the perfect video signal. A pass/fail determination is made using the rule set A3 applied to waveform portion 1 and rule set A2 applied to waveform portion 2.

The commands described above may be applied in a method for validating a signal in accordance with the invention in the preparatory or training stage in which a plurality of known, good waveforms are processed for determination of the rules to be associated therewith, and subsequent storage in the data storage unit 32. In such a stage, comparison templates are created using the computer 26, user interface 28 and display 30, each comparison template corresponding to a specific one of the waveforms capable of being validated, and each template having associated rules that apply to one or more portions or sections of the waveform under test, i.e., the waveform to be validated. The commands are designed to simplify the association of the rules to the waveforms or portions thereof. Moreover, the index stored in association with the comparison templates in the data storage unit 32 contains information as to which rule should be applied to which waveform.

Accordingly, using the user interface 28, an individual preparing the known, good waveforms is capable of assigning of one rule to a plurality of waveforms and causing that one rule to be stored for application to the plurality of waveforms in the data storage device. The individual can also assign one rule as a default for the plurality of waveforms if no other rule is assigned to one of the plurality of waveforms and causing the default rule to be stored for application to the plurality of waveforms in the data storage device. The individual can also assign a consecutive range of rules to a consecutive range of the plurality of waveforms and cause the consecutive range of rules to be stored for application to the consecutive range of the plurality of waveforms in the data storage device. The individual can also group the rules into at least one chapter each including a plurality of rules and cause each chapter to be stored in the data storage device. Each chapter may correspond to a single video frame or other generic waveform grouping.

The invention is described above generally with regards to a static video image, but may easily be expanded to dynamic video images or waveforms by adding the concept of 'chapters' to the 'book'. Each chapter would be accessed as required by the controlling software and hardware (in response to a video frame counter or other form of detection of changed image content) and would supply a new set of rules to apply to the changing video signal under test. The controlling software and hardware may be resident in the signal validation unit 34.

The method of creating a set of error bounds from a known-good signal may be improved to allow operation with electrical or video waveforms that may have a degree of electrical signal noise (considered a Y-axis variation). Such signal noise is characterized as distortion and jeopardizes the likelihood that the signal will be successfully compared to a 'golden' rule. In the environment of some instruments and test stations, some signal noise is unavoidable and must be allowed for. An 'adaptive' (noise tolerant) rule may be created by sampling subsequent iterations of the golden waveform in the same environment and creating the final rule by using the largest values for the upper bounds (a MAX function) and the smallest values for the lower bounds (a MIN function).

This technique is not the same as simply increasing the metric that is added/subtracted to the waveform basis to originally construct the rule (see step 12 above). For example, when digitizing and capturing deflection-driven video signals such as raster video and stroke video, signal noise from one digitized 'pixel' may bleed over in the X axis and/or Y axis, i.e., from a pixel on one line to a different pixel on a different line. In this instance, a simple additive metric is incapable of characterizing the present signal noise. The use of adaptive rules allows golden image comparison with imperfect, but acceptable electric waveforms.

The capabilities and benefits of this invention are thus:

a. Ability to apply a rule to a video line and compute a pass/fail result.

b. Ability to apply rules to many video lines and automatically compute a pass/fail result.

c. Ability to compute the percentage of the video line that failed above or below the bounds as defined in the applied rule.

d. Test reports may be reported visually in a window on the computer or returned programmatically to a separate software module.

As described above, the creation of the set of error bounds, i.e., the calculation of the error bounds envelope, takes into account Y-axis variations (i.e., signal noise). In another and possibly preferred embodiment of the invention, recognition during experimentation with an ePVGA that even video card capture hardware has slight variations on the X-axis (signal jitter), the error bounds envelope is expanded to include the effects of jitter which can be set via one or more control or interface devices by the user. Thus, both signal noise (Y-axis variations) and jitter (X-axis variations) can be addressed by creation of error bounds templates. This makes for a much better waveform analysis and comparison system for real world applications.

The error bounds templates for jitter may be created and used in the same manner as the error bounds templates for signal noise is created and used, as described above. However, instead of upper and lower bounds indicating a vertical displacement, forward and rearward error bounds would be created indicating a left and right horizontal displacement or shift. As used herein then, a higher error bounds will therefore mean either the upper error bounds for signal noise analysis or the forward, rightward error bounds for jitter, and correspondingly, a lower error bounds will mean either the lower error bounds for signal noise analysis or the rearward, leftward error bounds for jitter.

Also, if only jitter is sought to be analyzed, it is conceivable that only an error bounds templates for X-axis variations are created and used, without consideration of signal noise.

The foregoing evidences conception by the inventors herein of automatic test equipment that is designed for the testing of electronic signals generated by equipment under test including, but not limited to, complex video signals. Moreover, the disclosure above evidences conception of software methods, such as algorithms embodied on computer-readable media, for determining the validity of an electrical signal and software methods for analyzing the image content of generic video signals.

With the method and equipment in accordance with the invention, significant advantages are obtained relative to known methods and equipments. For example, the present invention, in one or more of the configurations disclosed above, provides a quick and efficient method to validate video signals, audio signals and/or other electrical signals. It also provides a method including software algorithms, for analyzing the image content of generic video signals. Further, it also provides a method involving a rule database with an index used to govern the software algorithms in the prior object.

The present invention also differs from previous methods of validation in that it does not require many timing measurements at calculated time intervals within a video frame and is thus not labor-intensive, and also does not require computer-intensive analysis of image components. Even further, the present invention overcomes drawbacks of the previous methods is that it does not involve manual re-engineering for every new video image content.

In the context of this document, computer-readable medium could be any means that can contain, store, communicate, propagate or transmit a program for use by or in connection with the method, system, apparatus or device. The computer-readable medium can be, but is not limited to (not an exhaustive list), electronic, magnetic, optical, electromagnetic, infrared, or semi-conductor propagation medium. The medium can also be (not an exhaustive list) an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The medium can also be paper or other suitable medium upon which a program is printed, as the program can be electronically captured, via for example, optical scanning of the paper or other medium, then compiled, interpreted, or otherwise processed in a suitable manner, if necessary, and then stored in a computer memory. Also, a computer program or data may be transferred to another computer-readable medium by any suitable process such as by scanning the computer-readable medium.

As an example of a computer program in accordance with the invention, the signal validation unit 34 includes a computer program that identifies a waveform to be validated, also referred to as a waveform-under-test, or otherwise is provided with such a waveform and determines a comparison template to obtain to use in validating the waveform. The computer program then links with the data storage unit 32, via any known linking, e.g., a simple cabling arrangement or via a telecommunications or Internet link, and retrieves information about the comparison template. Specifically, the signal validation unit 34 directs the data storage unit 32 to provide, via access to the index at the data storage unit 32, the set or sets of rules needed to validate the signal. The set or sets of rules are directed from the data storage unit 32 to the signal validation unit 34. When multiple sets of rules are provided, the data storage unit 32 may also provide information about which set is to be applied to which portion of the waveform. The program at the signal validation unit 34 receives this information and processes it, i.e., generates the demarcation regions on a display based on the set(s) of rules for the waveform provided by the data storage unit 32.

Another program may be resident at the computer 26 and is capable of processing commands enter via the user interface 28 relating to assignment of rules to waveforms, e.g., the commands mentioned above. This program also interfaces with display 30 to cause changes to the waveform on the display 30 based on the user input at the user interface 28 and with the data storage unit 32 to direct storage of the rules in association with the waveforms, and generation of the index to allow for retrieval of rules based on input of a comparison template associated with a particular waveform.

In the invention, signal noise and jitter are examples, and not the only root causes, for limit boundaries. As such, mention of the application of the invention with reference to signal noise and jitter is not intended to limit the scope of the invention in any manner whatsoever. Rather, the invention is considered to be applicable for multiple situations, such as if an electronic signal is captured and tolerances that are not due to signal noise and/or jitter are used.

As used herein, a tool or a software tool is usually defined to mean a program that aids in the development of other programs. A tool may assist a software or computer programmer in the design, code, compile, link, edit, or debug phases.

As used herein, a user interface is usually defined to mean the aspects of a computer system or program that can be seen (or heard or otherwise perceived) by the human user, and the commands and mechanisms the user uses to control its operation and input data.

As used herein, jitter is considered the small rapid variations in the amplitude or timing of a waveform arising from fluctuations in the voltage supply, mechanical vibrations, etc.

Having thus described a few particular embodiments of the invention, various alterations, modifications, and improvements will readily occur to those skilled in the art. For instance, the invention can be adapted to other methods of creating golden templates or the alteration of the types of association commands used, or how and where the rules are stored. Such alterations, modifications and improvements as are made obvious by this disclosure are intended to be part of this description though not expressly stated herein, and are intended to be within the spirit and scope of the invention. Accordingly, the foregoing description is by way of example only, and is not limiting. The invention is limited only as defined in the claims and equivalents thereto.

What is claimed is:

1. A method of enabling validation of a waveform and validating the waveform using a computing device including a processor, comprising:
   determining, using a processor and a user interface interacting with the processor, a different rule for each of a plurality of reference waveforms, each rule being determined to include a template defining higher and lower error bounds for each of a plurality of values in a respective one of the reference waveforms;
   storing the determined rule for each of the plurality of reference waveforms in a data storage device such that the rules are stored in association with the respective reference waveforms; and then
   using a user interface and when seeking to validate a test waveform,
      selecting one of the rules stored in the data storage device to use for the validation based on similarities between the test waveform and a reference waveform associated with the selected rule; and
      directing retrieval of the selected rule stored in the data storage device,
   wherein the step of determining a different rule for each of a plurality of reference waveforms comprises:
      enabling via a user interface, assignment of one rule to a plurality of the reference waveforms and storing that one rule in association with the plurality of reference waveforms in the data storage device; or
      enabling via a user interface, assignment of one rule as a default for the plurality of reference waveforms if no other rule is associated with one of the plurality of reference waveforms and storing the default rule in association with the plurality of reference waveforms in the data storage device; or
      enabling via a user interface, assignment of a consecutive range of rules to a consecutive range of the plurality of reference waveforms, and storing the consecutive range of rules in association with the consecutive range of the plurality of reference waveforms in the data storage device; or
      grouping the rules into at least one chapter each including a plurality of rules and storing the at least one chapter in the data storage device, whereby each chapter corresponds to a single video frame or other generic waveform grouping.

2. The method of claim 1, further comprising:
   enabling a user, using a user interface and a display, to show individual data points constituting the higher and lower error bounds and to modify only a portion of data points of the higher and lower error bounds for each of the reference waveforms without modifying a remaining portion of the higher and lower error bounds; and
   storing, in the data storage device, as the determined rule for each for the reference waveforms, the modified higher and lower error bounds.

3. The method of claim 1, further comprising:
   providing the processor with parameters describing each of the reference waveforms without providing actual waveforms to the processor; and
   calculating, using the processor, data points of the reference waveforms;
   the step of determining a different rule for each of a plurality of reference waveforms comprising determining a rule based on the calculated data points.

4. The method of claim 1, further comprising:
enabling a user, using a user interface, to modify the higher and lower error bounds for each of the reference waveforms; and
storing, in the data storage device, as the determined rule for each of the reference waveforms, the modified higher and lower error bounds.

5. The method of claim 1, wherein the step of determining a different rule for each of a plurality of reference waveforms further comprises:
providing a metric for adjustment of the higher and lower error bounds; and
adding or subtracting the metric from the reference waveform to thereby define the higher and lower error bounds.

6. The method of claim 1, wherein the waveform is validated by calculating, using a processor, a portion of the test waveform that exists inside the higher and lower error bounds of the template included in the selected rule and analyzing, using a processor, the calculated portion relative to a programmable metric in order to determine a pass or fail criteria.

7. The method of claim 1, wherein the template of each rule defines the higher and lower error bounds determined for the respective reference waveform from an initial capture of that reference waveform, further comprising:
modifying the higher and lower error bounds for each of the reference waveforms by calculating the higher and lower error bounds from subsequent captures of the same reference waveform,
the step of determining a different rule for each of a plurality of reference waveforms further comprising using only the largest values for the higher error bounds and only the smallest values for the lower error bounds to thereby create adaptive, noise-tolerant bounds.

8. The method of claim 1, further comprising:
storing in the data storage device, an index containing information as to which rule is associated with each reference waveform; or
enabling via the user interface, assignment of one rule to a plurality of reference waveforms and storing that one rule for application to the plurality of reference waveforms in the data storage device.

9. The method of claim 1, further comprising:
enabling via the user interface, assignment of one rule as a default for the plurality of reference waveforms if no other rule is determined for one of the plurality of reference waveforms and storing the default rule in association with the plurality of reference waveforms in the data storage device; or
enabling via the user interface, assignment of a consecutive range of rules to a consecutive range of the plurality of reference waveforms and storing the consecutive range of rules in association with the consecutive range of the plurality of reference waveforms in the data storage device; or
grouping the rules into at least one chapter each including a plurality of rules and storing the at least one chapter in the data storage device, whereby each chapter corresponds to a single video frame or other generic waveform grouping.

10. The method of claim 1, wherein the test waveform is validated with respect to signal noise, Y-axis variations such that the higher error bounds represents an upward vertical displacement and the lower error bounds represents a downward vertical displacement; or the test waveform is validated with respect to jitter, X-axis variations such that both the higher and the lower error bounds represent forward and rearward displacement.

11. The method of claim 1, wherein the step of determining a different rule for each of a plurality of reference waveforms further comprises:
providing a metric, useable via the user interface, to shift the higher and lower error bounds along an X-axis; and
when the metric is effected by the user interface, adding or subtracting the metric from the reference waveform to thereby define the higher and lower error bounds.

12. The method of claim 1, wherein the reference waveforms are known, good waveforms.

13. The method of claim 1, wherein each rule is determined, using the processor and the user interface interacting with the processor, to include a template defining higher and lower error bounds for all of the values in the respective one of the reference waveforms.

14. A method of enabling validation of a waveform and validating the waveform using a computing device including a processor, comprising:
determining, using a processor and a user interface interacting with the processor, a single rule for each of at least one group of reference waveforms, the reference waveforms in each group being associated with one another and utilized simultaneously with one another, the single rule for each of the at least one group of reference waveforms being determined to include a template defining individual higher and lower bounds for each of a plurality of values in the reference waveforms in that group,
storing the determined rule for each of the at least one group of reference waveforms in a data storage device such that the rules are stored in association with the respective group of reference waveforms; and
using a user interface and when seeking to validate a waveform comprising a group of test waveforms associated with one another and that are utilized simultaneously with one another,
selecting one of the rules stored in the data storage device to use for the validation based on similarities between the group of test waveforms to be validated and a group of reference waveforms associated with the selected rule; and
directing retrieval of the selected rule stored in the data storage device,
wherein the step of determining a single rule for each of at least one group of reference waveforms comprises:
enabling via a user interface, assignment of one rule to a plurality of the reference waveforms and storing that one rule in association with the plurality of reference waveforms in the data storage device; or
enabling via a user interface, assignment of one rule as a default for the plurality of reference waveforms if no other rule is associated with one of the plurality of reference waveforms and storing the default rule in association with the plurality of reference waveforms in the data storage device; or
enabling via a user interface, assignment of a consecutive range of rules to a consecutive range of the plurality of reference waveforms, and storing the consecutive range of rules in association with the consecutive range of the plurality of reference waveforms in the data storage device; or
grouping the rules into at least one chapter each including a plurality of rules and storing the at least one chapter in the data storage device, whereby each chapter corresponds to a single video frame or other generic waveform grouping.

15. The method of claim 14, wherein the at least one group of reference waveforms associated with one another and utilized simultaneously with one another is an R-G-B video frame, a YPbPr video frame or a YCbCr video frame.

16. The method of claim 14, wherein the group of test waveforms to be validated is validated by calculating, using a processor, a portion of each of its constituent test waveforms that exist inside the respective higher and lower error bounds and analyzing the calculated portions relative to a programmable metric in order to determine a pass or fail criteria on each constituent test waveform.

17. The method of claim 14, wherein the step of determining a single rule for each of at least one group of reference waveforms further comprises:
providing a metric for adjustment of the higher and lower error bounds; and
adding or subtracting the metric from each of the reference waveforms to thereby define the higher and lower error bounds for each of the reference waveforms.

18. The method of claim 17, wherein the group of test waveforms to be validated is validated by calculating, using a processor, a portion of each of its constituent test waveforms that exist inside the respective higher and lower error bounds and analyzing the calculated portions relative to a programmable metric in order to determine a pass or fail criteria on each constituent test waveform.

19. The method of claim 14, wherein the at least one group of reference waveforms is a video line such that the reference waveforms associated with one another and that are utilized simultaneously with one another constitute a video frame, whereby the higher and lower error bounds are calculated for every video line in the video frame.

20. The method of claim 19, wherein the group of test waveforms to be validated is validated by calculating, using a processor, a portion of each of its constituent test waveforms that exist inside the respective higher and lower error bounds and analyzing the calculated portions relative to a programmable metric in order to determine a pass or fail criteria on each constituent test waveform.

21. The method of claim 14, wherein each rule is determined, using the processor and the user interface interacting with the processor, to include a template defining higher and lower error bounds for all of the values in the respective one of the reference waveforms.

22. A method for storing higher and/or lower error bounds rules to enable application of the stored rules to validate a plurality of test waveforms using a computing device including a processor and validating the test waveforms, comprising:
determining, using a processor and a user interface interacting with the processor, a different rule for each of a plurality of reference waveforms, each rule being determined to include a template defining higher and lower error bounds for each of a plurality of values in a respective one of the reference waveforms; and
storing the determined rule for each reference waveform in a data storage device such that the rules are stored in association with the respective reference waveforms,
wherein the step of determining a different rule for each of a plurality of reference waveforms comprises:
enabling via a user interface, assignment of one rule to a plurality of the reference waveforms and storing that one rule in association with the plurality of reference waveforms in the data storage device; or
enabling via a user interface, assignment of one rule as a default for the plurality of reference waveforms if no other rule is associated with one of the plurality of reference waveforms and storing the default rule in association with the plurality of reference waveforms in the data storage device; or
enabling via a user interface, assignment of a consecutive range of rules to a consecutive range of the plurality of reference waveforms, and storing the consecutive range of rules in association with the consecutive range of the plurality of reference waveforms in the data storage device; or
grouping the rules into at least one chapter each including a plurality of rules and storing the at least one chapter in the data storage device, whereby each chapter corresponds to a single video frame or other generic waveform grouping.

23. The method of claim 22, further comprising:
providing a known, good instance of each of the plurality of reference waveforms to the processor; or
providing the processor with parameters describing a known, good instance of each of the plurality of reference waveforms without providing an actual known, good instance of the reference waveform to the processor and calculating, using the processor, data points of the known, good instance of each of the plurality of reference waveforms,
the step of determining a different rule for each of a plurality of reference waveforms further comprising determining a rule based on the calculated data points.

24. The method of claim 22, further comprising:
storing in the data storage device, an index containing information as to which rule is associated with each reference waveform.

25. The method of claim 22, wherein the test waveforms are validated with respect to signal noise, Y-axis variations such that the higher error bounds represents an upward vertical displacement and the lower error bounds represents a downward vertical displacement, or wherein the test waveforms are validated with respect to jitter, X-axis variations such that both the higher and the lower error bounds represent forward and rearward displacement.

26. The method of claim 22, wherein each rule is determined, using the processor and the user interface interacting with the processor, to include a template defining higher and lower error bounds for all of the values in the respective one of the reference waveforms.

* * * * *